Jan. 2, 1962 W. I. JONES 3,015,141

HEAT SEALED FASTENER INSTALLATION

Filed April 29, 1958

INVENTOR:
Walter I. Jones.

United States Patent Office 3,015,141
Patented Jan. 2, 1962

3,015,141
HEAT SEALED FASTENER INSTALLATION
Walter I. Jones, Belmont, Mass., assignor to United-Carr Fastener Corporation, Cambridge, Mass., a corporation of Delaware
Filed Apr. 29, 1958, Ser. No. 731,759
1 Claim. (Cl. 24—216)

My invention aims to provide improvements in fastening and like devices and more particularly snap fastening installations where the fastener is attached to its supporting structure by heat sealing as by high frequency electronic means. It also relates to improved methods of combining a fastening and like device to a support and the forming of the material of the support into an attractive design.

An object of my invention is to attach a snap fastener member to a supporting material by heat sealing the parts together in a stronger and more attractive manner than just plain heat sealing.

Another object of my invention is to provide a more presentable combination of fastener member and support which are attained during the assembly operation and with a minimum of effort and materials.

Referring now to the drawing which illustrates a preferred embodiment of my invention;

Figure 1:
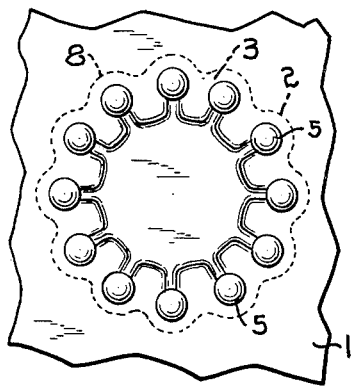
FIG. 1 is a plan view of an installation showing a design formed on the outside face of the material and a portion of a fastener being shown in dotted lines.

While I have illustrated in the drawings the combination of a supporting material 1, preferably a piece of commonly called plastic sheeting, and a snap fastener socket member 2, preferably formed of injection molded plastic material, I wish it to be understood from the beginning that the supporting structure may be other than plastic sheeting. The supporting material 1 may be a woven material, paper and in fact, any material to which a plastic member may be heat sealed. Furthermore, the member attached may be any suitable type of fastening device.

In the particular installation illustrated, I have shown the socket member 2 as being provided with a base flange 3 and a hollow projection 4 suitably shaped to receive and engage with a cooperating snap fastener stud, not shown.

Figure 3:
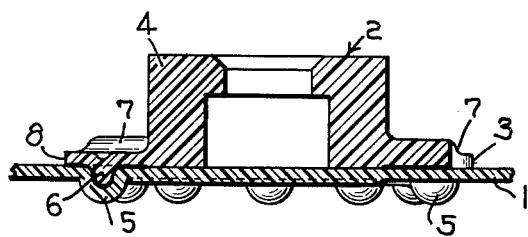
FIG. 3 is an enlarged section taken on the line 3—3 of FIG. 2.
Figure 4:
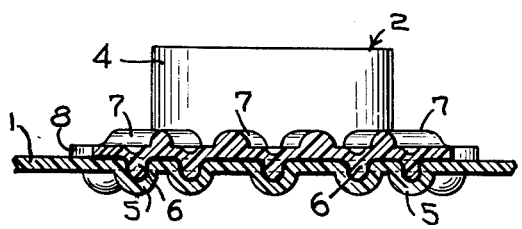
FIG. 4 is an enlarged section taken on the line 4—4 of FIG. 2.

Upon completion of the assembly of the socket 2 to the support 1, there is provided a suitable design portion (FIG. 1) which in the drawings is primarily a series of dots 5, formed by a combination of the material 1 and portions 6 of the base flange 3 of the socket as shown in FIGS. 3 and 4.

Figure 2:
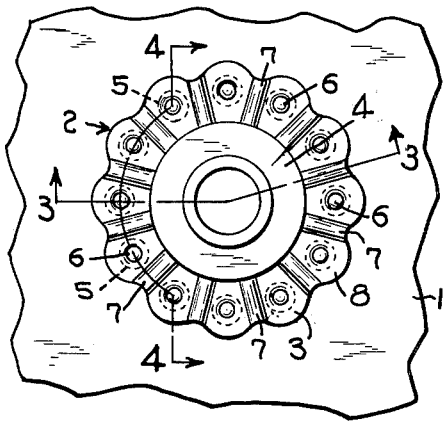
FIG. 2 is a view of the reverse side of the installation from FIG. 1 showing the snap fastener socket member.

At the same time, the base flange is formed into a suitable interrupted arrangement, in this case a series of bar like portions 7 and a scalloped edge 8 as shown in FIGS. 2 and 4. As shown in FIGS. 3 and 4, the area of union of the base flange to the support as well as the respective free faces of the flange and the support, in cross-section, define a series of alternate raised and depressed portions. The raised portions of the free faces of the base flange and the support are in staggered relation to one another.

The method by which I form the interrupted flange and the front face design at the same time the parts are heat sealed together is important, but I have not illustrated the equipment by which the method and ultimate results are secured because the equipment might vary as would be understood by anyone skilled in the art. It is sufficient to point out that the socket 2 may be applied to the sheet 1 by any suitable applying mechanism which has opposed die members between which the two may be squeezed in combination with a suitable high frequency electronic unit. The ends of the die members will be provided with the suitable flange forming portions and the design forming portions as will be well understood.

Figure 5:
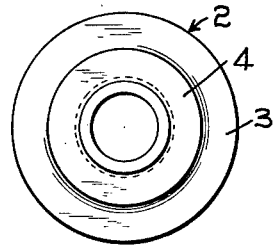
FIG. 5 is a plan view of a snap fastener socket member prior to attachment.
Figure 6:
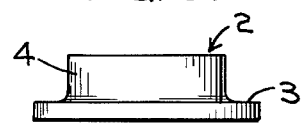
FIG. 6 is an edge view of the socket member shown in FIG. 5.

As will be seen from FIGS. 5 and 6, the base flange 3 of the socket is preferably of thin uniform section before application to the support 1, but during the application of the parts to each other, the shape of the flange 3 is changed while the flange is being heat sealed to the support 1. As a result of this method and the pre-conceived reconstruction of the flange, I have provided for an installation where the attachment is stronger and longer wearing because of the forming of the ribs 7 which provide the strength as against the ordinary type of heat sealing which would merely thin out the flange and weaken it to such an extent that the main body of the socket would pull loose from the flange after repeated snapping and resnapping with a cooperating stud.

It is also important to note that when a design on the front of the installation is desirable, such a design is provided by my improved method and improved construction without adding any other materials. By suitably shaping one of the assembling dies the series of dots 5 (or any other desirable design) is formed by combination of portions of the flange 3 and portions of the suppporting material 1 as shown in FIGS. 3 and 4. This also adds to the strength of the installation as well as to the pleasing effect.

My invention is the result of finding a remedy for poor, weak and plain looking applications which were being constructed by me and as a result, I conceived and put into effect the invention herein described and claimed and which has been found to be very acceptable and to cure the weaknesses of previous installations.

While I have illustrated and described a preferred embodiment of my invention, reference is made to the following claim which best defines the scope of my invention.

I claim:

A heat-sealed fastener installation comprising, in combination, a supporting material and a thermoplastic fastening device secured thereto, said fastening device including a generally circular flange portion having a scalloped perimetral edge electronically sealed to one face of said supporting material, the area of union between said flange portion and said supporting material and the free faces of the flange element and the supporting material, in cross-section, defining a plurality of alternate raised and depressed portions, the raised portions of the free faces of said flange portion and said supporting material being in staggered relation to one another.

References Cited in the file of this patent

UNITED STATES PATENTS

| | | |
|---|---|---|
| 2,656,541 | Beaver et al. | Oct. 27, 1953 |
| 2,685,911 | Haller | Aug. 10, 1954 |
| 2,723,477 | Markus et al. | Nov. 15, 1955 |
| 2,809,399 | Mead et al. | Oct. 15, 1957 |
| 2,855,040 | Gaines | Oct. 7, 1958 |
| 2,891,340 | Markus et al. | June 23, 1959 |